(12) United States Patent
Takada et al.

(10) Patent No.: US 6,831,691 B1
(45) Date of Patent: Dec. 14, 2004

(54) SOLID-STATE IMAGE PICKUP DEVICE

(75) Inventors: Kenji Takada, Itami (JP); Satoshi Nakamura, Ikeda (JP); Yoshio Hagihara, Amagasaki (JP); Shigehiro Miyatake, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/283,358

(22) Filed: Mar. 31, 1999

Related U.S. Application Data

(60) Provisional application No. 60/097,652, filed on Aug. 24, 1998.

(30) Foreign Application Priority Data

Apr. 15, 1998 (JP) .......................................... 10-104442

(51) Int. Cl.[7] ................................................. H04N 3/14
(52) U.S. Cl. ....................................... 348/308; 348/302
(58) Field of Search ................................. 348/294, 302, 348/303, 304, 307, 308

(56) References Cited

U.S. PATENT DOCUMENTS

| | | | | |
|---|---|---|---|---|
| 5,241,575 A | * | 8/1993 | Miyatake et al. | 377/60 |
| 6,201,617 B1 | * | 3/2001 | Kusaka | 348/297 |
| 6,410,899 B1 | * | 6/2002 | Merrill et al. | 348/308 |
| 6,501,064 B2 | * | 12/2002 | Kole | 348/308 |
| 6,603,513 B1 | * | 8/2003 | Berezin | 348/308 |
| 6,630,957 B1 | * | 10/2003 | Kuroda et al. | 348/294 |
| 6,636,261 B1 | * | 10/2003 | Pritchard et al. | 348/308 |
| 6,734,907 B1 | * | 5/2004 | Hagihara et al. | 348/308 |

* cited by examiner

*Primary Examiner*—Wendy R. Garber
*Assistant Examiner*—Jacqueline Wilson
(74) *Attorney, Agent, or Firm*—Sidley Austin Brown & Wood LLP

(57) ABSTRACT

A solid-state, two-dimensional image sensing device having a matrix of pixels each of which employs a photosensor that generates a photocurrent and a MOS circuit which outputs a signal proportional to the logarithm of the integral over time of the photocurrent. The sensor includes an integration control switching device so that all pixels in the array have equal integration time. The sensor integrates the signal for each pixel for a period of time and stores the integrated signal in a pixel signal storage location. The sensor further accumulates signal in a MOS transistor pn-junction during a time that the integrated pixel signal is being read out so image information can be collected continuously even while the integrated pixel signal for each pixel is being read.

24 Claims, 10 Drawing Sheets

SOLID-STATE IMAGE PICKUP DEVICE

RELATED APPLICATIONS

This application is based on Japanese Patent Application No. 10-104442, the entire contents of which is incorporated herein by reference. This application claims the benefit of prior filed copending U.S. Provisional Application No. 60/097,652 filed Aug. 24, 1998.

FIELD OF THE INVENTION

The present invention relates to a solid-state image pickup device and, more particularly, to a solid-state image pickup device comprising pixels arranged in two dimensions.

BACKGROUND OF THE INVENTION

A two-dimensional solid-state image pickup device, where the pixels are arranged to form a matrix (with rows and columns), and in which each pixel includes a photo-electric converting element, such as a photodiode, and means for drawing out photoelectric charges generated in the photoelectric converting element onto an output signal line, have had a wide variety of applications. Such solid-state image pickup devices can be subdivided into a CCD type and a MOS type depending on the means for reading put (drawing out) the photoelectric charges generated in the photoelectric converting element. In a CCD image pickup device, the photoelectric charges are transferred while being accumulated in potential wells. In a MOS image pickup device, on the other hand, charges accumulated in the pn junctions capacitance of a photodiode are read out by means of a MOS transistor.

The structure of each pixel in a conventional MOS solid-state image pickup device will be described next in reference to FIG. 13. In the drawing, PD denotes a photodiode and Tr1 denotes an n-channel MOS transistor having a drain connected to the cathode of the photodiode PD, a source connected to an output signal line Lsig, and a gate connected to a column select line Lvsel. When light is incident upon the photodiode PD, charges proportional to the quantity of incident light are generated and accumulated (integrated) in the pn junction capacitance of the photodiode PD. At the completion of the integration process, a high voltage is applied to the column select line Lvsel to bring the transistor Tr1 into the ON state. Upon the turning ON of the transistor Tr1, the charges accumulated in the pn junction capacitance of the photodiode PD are outputted to the output signal line Lsig to be read, out.

However, the aforesaid CCD solid-state image pickup device has the drawback of a narrow dynamic range because only the potential of the charges generated in the photodiode is accumulated and transferred. On the other hand, the conventional MOS solid-state image pickup device has several drawbacks including: an insufficiently wide dynamic range—albeit wider than the dynamic range of the CCD solid-state image pickup device—because the charges generated in proportion to the quantity of incident light are accumulated in the pn junction capacitance of the photodiode; a degraded S/N ratio (signal-to-noise characteristic), due to switching noise which results from the reading operation performed by switching the MOS transistor; and, differences in the time of integration between pixels because the reading operation is performed by switching the MOS transistor for each of the pixels sequentially. Specifically, when the respective MOS transistors for two photodiodes are sequentially activated, as shown in FIG. 12, the turning ON of a second MOS transistor (e.g., Tr5), which corresponds to a column select line that is subsequent to the column select line Lvsel connected to the transistor Tr1, the turning on of transistor Tr5 lags behind the turning ON of the transistor Tr1. Although integration in a photodiode connected to the transistor Tr5 is initiated simultaneously with integration in the photodiode PD connected to the transistor Tr1, provided that light is incident concurrently, the reading operation from the transistor Tr1 leads the reading operation from the transistor Tr5 due to the switching time difference, so that an integration time in the transistor Tr1 is different from an integration time in the transistor Tr5.

SUMMARY OF THE INVENTION

It is therefore an object of the present invention to provide a two-dimensional solid-state image pickup device with a sufficiently wide dynamic range. Another object of the present invention is to provide a two-dimensional solid-state image pickup device wherein all pixels can be integrated with the same timing.

These and other objects of the present invention are achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor, the second MOS transistor operating in the subthreshold region; a capacitor having one terminal connected to a second electrode of the second MOS transistor and the other terminal connected to a fixed voltage, the capacitor being reset via the second MOS transistor when a reset voltage is supplied to a first electrode of the second MOS transistor; and a third MOS transistor for read operation having a first electrode connected to the one terminal of the capacitor, a second electrode connected to an output signal line, and a gate electrode connected to a column select line.

In this arrangement, a photoelectric current generated in the photodiode is logarithmically converted in the first MOS transistor and the gate voltage thereof becomes proportional to the current through logarithmic conversion. The voltage is used to charge the capacitor through the second MOS transistor. At the completion of integration, the third MOS transistor is turned ON and a voltage on the capacitor is led out onto the output signal line. Afterward, when the reset voltage is applied to the first electrode of the second MOS transistor, the voltage on the capacitor is reset to a reset value and integration in the capacitor is initiated again.

The objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a capacitor having one terminal connected to a second electrode of the second MOS transistor and the other terminal connected to a fixed voltage, the capacitor integrating a signal based on photoelectric charges generated in the photodiode; a third MOS transistor for read operation having a first electrode connected to the one terminal of the capacitor, a second electrode connected to an output signal line, and a gate electrode connected to a column select line; and a fourth MOS transistor having a first electrode connected to the one terminal of the capacitor and a second electrode connected to a direct-current voltage, the fourth MOS transistor being turned ON in response to a reset pulse applied to a gate electrode thereof to reset the capacitor to an initial state.

In this arrangement, the integration in the capacitor and the reading of a voltage from the capacitor are performed in the same manner as in the case of the first embodiment; however, the resetting of the capacitor is performed by turning ON the fourth MOS transistor that is connected in parallel with the capacitor. Accordingly, the resetting of the capacitor is performed more accurately at a higher speed.

The objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a capacitor having one terminal connected to receive a signal from a second electrode of the second MOS transistor and the other terminal connected to a fixed voltage, the capacitor integrating a signal based on photoelectric charges generated in the photodiode; a third MOS transistor for read operation having a first electrode connected to the one terminal of the capacitor, a second electrode connected to an output signal line, and a gate electrode connected to a column select line; and a fourth MOS transistor having a first electrode connected to the one terminal of the capacitor and a second electrode connected to a direct-current voltage, the fourth MOS transistor being constantly in the ON state with a direct-current voltage applied to a gate thereof.

In this arrangement, the fourth MOS transistor, which is constantly in the ON state, is essentially equivalent to a resistor having a specified value so connected to the capacitor. Consequently, an initial value in the capacitor is determined by the resistor. In other words, the initial value in the capacitor can be adjusted by varying a direct-current voltage applied to the gate electrode of the fourth MOS transistor.

The objects of the present invention may also be achieved by a two-dimensional solid-state image pickup device comprising pixels arranged to form a matrix, each of the pixels including: a photoelectric converting element; logarithmic converting means for changing an output current from the photoelectric converting element into a logarithmically converted voltage; a MOS transistor having a gate electrode to which the output voltage from the logarithmic converting means is applied; a capacitor having one terminal connected to receive an output current from a second electrode of the MOS transistor via first switching means and the other terminal connected to a fixed voltage; and second switching means connected to the one terminal of the capacitor and to an output signal line, wherein integration in the capacitor is performed by turning ON the first switching means and turning OFF the second switching means, a voltage is led out from the capacitor onto the output signal line by turning OFF the first switching means and turning ON the second switching means, and the capacitor is reset with the application of a reset voltage to a first electrode of the MOS transistor by turning ON the first switching means and turning OFF the second switching means.

This arrangement allows the reading operations to be performed with respect to each of the pixels by simultaneously turning OFF the first switching means for each of the pixels, and then turning ON the second switching means for each pixel to be read. Thus, the integration time can be equalized for each of the pixels. In other words, the integration time can be equalized for each of the pixels since it is possible to initiate integration by simultaneously turning ON the first switch and then complete the integration by simultaneously turning OFF the first switch.

The objects of the present invention may also be achieved by a two-dimensional solid-state image pickup device comprising pixels arranged to form a matrix, each of the pixels including: a photoelectric converting element; logarithmic converting means for changing an output current from the photoelectric converting element into a logarithmically converted voltage; a MOS transistor having a gate electrode to which the output voltage from the logarithmic converting means is applied; a capacitor having one terminal connected to receive an output current from a second electrode of the MOS transistor via first switching means and the other terminal connected to a fixed voltage; second switching means for read operation connected to the one terminal of the capacitor and to an output signal line; and resetting means connected to the one terminal of the capacitor, wherein charges are accumulated in a pn junction capacitance of the MOS transistor while a voltage on the capacitor is read therefrom by turning OFF the first switching means and the first switching means is turned ON after the completion of the read operation to transfer the charges from the pn junction capacitance to the capacitor.

This arrangement not only equalizes the timing for integration for each of the pixels like the forth embodiment, but also allows signal integration to be performed by using the pn junction capacitance of the MOS transistor during the time of the reading operation. After the reading operation is completed, the charges accumulated in the pn junction capacitance can be transferred to the capacitor so that the charges are continuously accumulated in the capacitor (integration). By thus performing a part of the integration process in parallel with the read operation, a solid-state image pickup device with excellent responsivity is implemented to provide a reduced exposure time.

The objects of the present invention may also be achieved by a two-dimensional solid-state image pickup device comprising pixels arranged to form a matrix, each of the pixels including: a photoelectric converting element; logarithmic converting means for changing an output current from the photoelectric converting element into a logarithmically converted voltage; a MOS transistor having a gate to which the output voltage from the logarithmic converting means is applied; a capacitor having one terminal connected to receive an output current from a second electrode of the MOS transistor via first switching means and the other terminal connected to a fixed voltage; second switching means for read operation connected to the one terminal of the capacitor and to an output signal line; and resetting means connected to the one terminal of the capacitor, wherein integration in the capacitor is performed by turning ON the first switching means and turning OFF the second switching means, while a voltage on the capacitor is read therefrom onto the output signal line by turning OFF the first switching means and turning ON the second switching means, a pn junction capacitance of the MOS transistor in which charges based on a photoelectric current are accumulated is reset with the application of a reset voltage to a first electrode of the MOS transistor and then integration in the pn junction capacitance is initiated, the capacitor is reset by the resetting means after turning OFF the second switching means, charges are transferred from the pn junction capacitance to the capacitor by turning ON the first switching means, and integration in the capacitor is subsequently performed based on the photoelectric current.

The arrangement above is essentially the same as the one previously described to the extent that the timing for integration can be equalized for each of the pixels and responsivity can be improved. In addition, the present arrangement performs the resetting of the pn junction capacitance of the MOS transistor and the resetting of the capacitor by using the separate and distinct means. Specifically, the pn junction capacitance of the MOS transistor is reset by applying the reset voltage to the first electrode of the MOS transistor and the capacitor is reset by the resetting means connected to the one terminal of the capacitor. Consequently, the capacitor can be reset more precisely at a higher speed.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having a cathode connected to a first DC (direct current) voltage; a first n-channel MOS transistor having a drain and a gate each connected to an anode of the photodiode and a source connected to a second DC voltage; a second n-channel MOS transistor having a gate connected to the gate of the first n-channel MOS transistor and a source connected to the second DC voltage through a capacitor; and a third n-channel MOS transistor having a drain connected to the source of the second n-channel MOS transistor and to the capacitor, a gate connected to a column select line, and a source connected to an output signal line, wherein the first and second MOS transistors are biased to operate in a subthreshold region, a clock pulse is supplied to a drain of the second MOS transistor to set a voltage on the capacitor to an initial value such that the capacitor produces an output voltage proportional to the logarithm of the time integral of the quantity of incident light, and the third MOS transistor is so constituted to read the output voltage.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having a cathode connected to a first DC voltage; a first n-channel MOS transistor having a drain and a gate each connected to an anode of the photodiode and a source connected to a second DC voltage; a second n-channel MOS transistor having a drain connected to the first DC voltage, a gate connected to the gate of the first n-channel MOS transistor, and a source connected to the second DC voltage through a capacitor; a third n-channel MOS transistor having a drain connected to the source of the second n-channel MOS transistor and to the capacitor, a gate connected to a column select line, and a source connected to an output signal line; and a fourth n-channel MOS transistor having a drain connected to the source of the second n-channel MOS transistor and to the capacitor, a gate connected to a reset line, and a source connected to the second DC voltage for determining an initial voltage on the capacitor, wherein the first and second MOS transistors are biased to operate in a subthreshold region, a voltage on the capacitor is set to the initial value by turning ON the fourth MOS transistor such that the capacitor produces an output voltage proportional to the logarithm of the time integral of the quantity of incident light, and the third MOS transistor is so constituted to read the output voltage.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having a cathode connected to a first DC voltage; a first n-channel MOS transistor having a drain and a gate each connected to an anode of the photodiode and a source connected to a second DC voltage; a second n-channel MOS transistor having a gate connected to the gate of the first n-channel MOS transistor; a fifth n-channel MOS transistor having a drain connected to a source of the second n-channel MOS transistor, a gate connected to an integration-time control line, and a source connected to the second DC voltage through a capacitor; and a third n-channel MOS transistor having a drain connected to the source of the fifth n-channel MOS transistor and to the capacitor, a gate connected to a column select line, and a source connected to an output signal line, wherein the first and second MOS transistors are biased to operate in a subthreshold region, the fifth MOS transistor is turned ON upon application of a clock pulse to a drain of the second MOS transistor to set a voltage on the capacitor to an initial value such that the capacitor produces an output voltage proportional to the logarithm of the time integral of the quantity of incident light, an integration time is determined based on a period during which the fifth MOS transistor is in the OFF state to equalize the timing for integration in each of the pixels, and the third MOS transistor is so constituted to read the output voltage.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having a cathode connected to a first DC voltage; a first n-channel MOS transistor having a drain and a gate each connected to an anode of the photodiode and a source connected to a second DC voltage; a second n-channel MOS transistor having a gate connected to the gate of the first n-channel MOS transistor; a fifth n-channel MOS transistor having a drain connected to a source of the second n-channel MOS transistor, a gate connected to an integration-time control line, and a source connected to the second DC voltage through a capacitor; a third n-channel MOS transistor having a drain connected to the source of the fifth n-channel MOS transistor and to the capacitor, a gate connected to a column select line, and a source connected to an output signal line; and a fourth n-channel MOS transistor having a drain connected to the source of the fifth n-channel MOS transistor and to the capacitor, a gate connected to a reset line, and al source connected to a third DC voltage for determining an initial voltage on the capacitor, wherein the first and second MOS transistors are biased to operate in a subthreshold region, a clock pulse is applied to a drain of the second MOS transistor to set a voltage on the source of the second MOS transistor and on the drain of the fifth MOS transistor to an initial value, a voltage on the capacitor is set to the initial value by turning ON the fourth MOS transistor such that the capacitor produces an output voltage proportional to the logarithm of the time integral of the quantity of incident light, an integration time is determined based on a period during which the drain of the second MOS transistor is at a HIGH-level voltage to equalize the timing for integration in each of the pixels, and the third MOS transistor is so constituted to read the output voltage even during a period of integration.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having an anode connected to a first DC voltage; a first p-channel MOS transistor having a drain and a gate each connected to a cathode of the photodiode and a source connected to a second DC voltage; a second p-channel MOS transistor having a gate connected to the gate of the first p-channel MOS transistor and a source connected to the second DC voltage through a capacitor; and a third p-channel MOS transistor having a source connected to the source of the second p-channel MOS transistor and to the capacitor, a gate connected to a column select line, and a drain connected to an output signal line, wherein the first and second MOS transistors are biased to operate in a subthreshold region, a clock pulse is supplied to a drain of the second MOS transistor to set a voltage on the capacitor to an initial value such that the capacitor produces an output voltage proportional to the logarithm of the time integral of the quantity of incident light, and the third MOS transistor is so constituted to read the output voltage.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having an anode connected to a first DC voltage; a first p-channel MOS transistor having a drain and a gate each connected to a cathode of the photodiode and a source connected to a second DC voltage; a second p-channel MOS transistor having a drain connected to the first DC voltage, a gate connected to the gate of the first p-channel MOS transistor, and a source connected to the second DC voltage through a capacitor; a third p-channel MOS transistor having a source connected to the source of the second p-channel MOS transistor and to the capacitor, a gate connected to a column select line, and a drain connected to an output signal line; and a fourth p-channel MOS transistor having a drain connected to the source of the second p-channel MOS transistor and to the capacitor, a gate connected to a reset line, and a source connected to the second DC voltage for determining an initial voltage on the capacitor, wherein the first and second MOS transistors are biased to operate in a subthreshold region, a voltage on the capacitor is set to the initial value by turning ON the fourth MOS transistor such that the capacitor produces an output voltage proportional to the logarithm of the time integral of the quantity of incident light, and the third MOS transistor is so constituted to read the output voltage.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having an anode connected to a first DC voltage; a first p-channel MOS transistor having a drain and a gate each connected to a cathode of the photodiode and a source connected to a second DC voltage; a second p-channel MOS transistor having a gate connected to the gate of the first p-channel MOS transistor; a fifth p-channel MOS transistor having a drain connected to a source of the second p-channel MOS transistor, a gate connected to an integration-time control line, and a source connected to the second DC voltage through a capacitor; and a third p-channel MOS transistor having a source connected to the source of the fifth p-channel MOS transistor and to the capacitor, a gate connected to a column select line, and a drain connected to an output signal line, wherein the first and second MOS transistors are biased to operate in a subthreshold region, the fifth MOS transistor is turned ON upon application of a clock pulse to a drain of the second MOS transistor to set a voltage on the capacitor to an initial value such that the capacitor produces an output voltage proportional to the logarithm of the time integral of the quantity of incident light, an integration time is determined based on a period during which the fifth MOS transistor is in the OFF state to equalize the timing for integration in each of the pixels, and the third MOS transistor is so constituted to read the output voltage.

The objects of the present invention may also be achieved by a solid-state image pickup device comprising a semiconductor substrate, a plurality of pixels arranged in rows and columns on the substrate, and a scanning element for reading in time series respective signals from the pixels formed on the substrate, each of the pixels including: a pn-junction photodiode having an anode connected to a first DC voltage; a first p-channel MOS transistor having a drain and a gate each connected to a cathode of the photodiode and a source connected to a second DC voltage; a second p-channel MOS transistor having a gate connected to the gate of the first p-channel MOS transistor; a fifth p-channel MOS transistor having a drain connected to a source of the second p-channel MOS transistor, a gate connected to an integration-time control line, and a source connected to the second DC voltage through a capacitor; a third p-channel MOS transistor having a source connected to the source of the fifth p-channel MOS transistor and to the capacitor, a gate connected to a column select line, and a drain connected to an output signal line; and a fourth p-channel MOS transistor having a drain connected to the source of the fifth p-channel MOS transistor and to the capacitor, a gate connected to a reset line, and a source connected to a third DC voltage for determining an initial voltage on the capacitor, wherein the first and second MOS transistors are biased to operate in a subthreshold region, an integration time is determined based on a period during which a drain of the second MOS transistor is at a LOW-level voltage to equalize the timing for integration in each of the pixels, and the third MOS transistor is so constituted to read the output voltage even during a period of integration.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers wherein.

Figure 1:
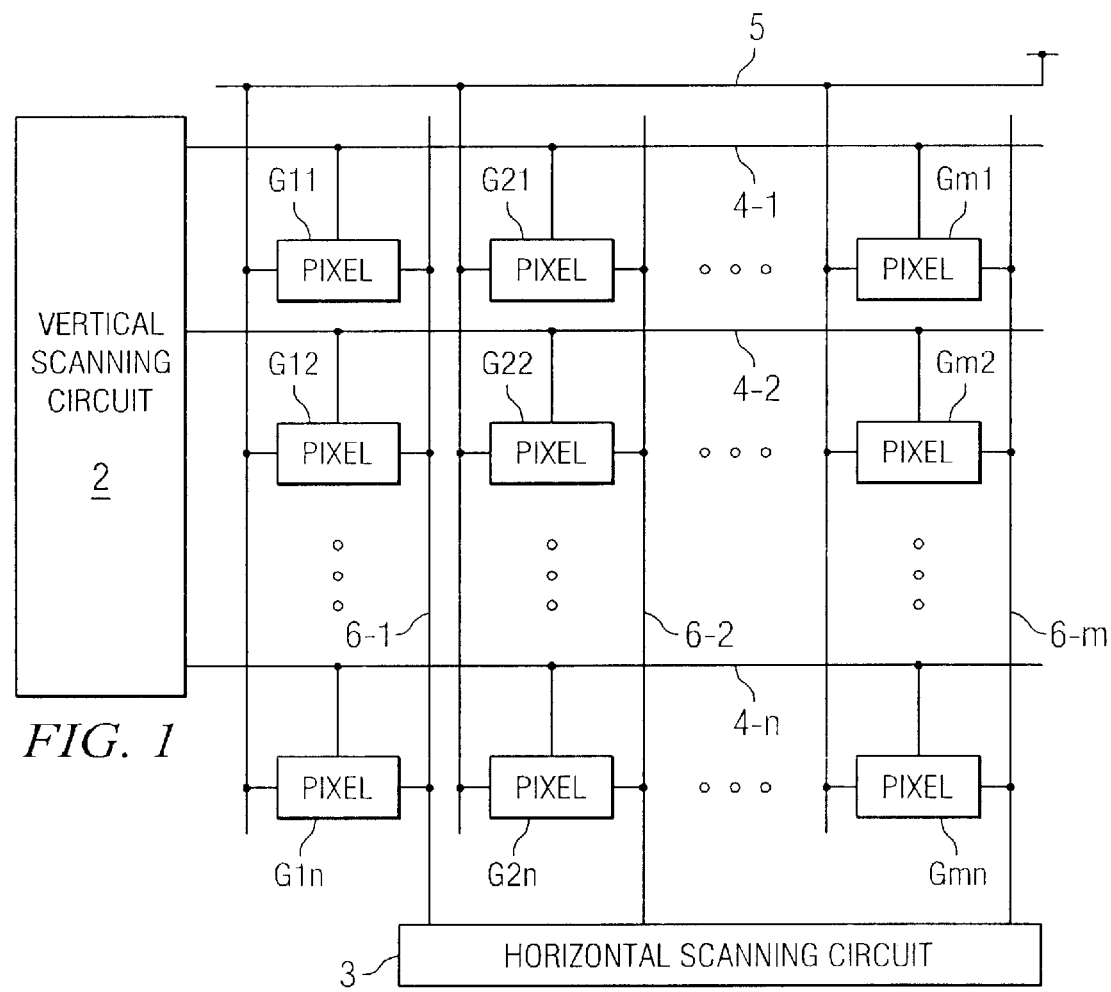
FIG. 1 is a block circuit diagram for illustrating the entire structure of a two-dimensional solid-state image pickup device according to the present invention.

In the various figures, the reference numerals have the following meanings:

| 1a to 1d | pixels |
| 2 | vertical scanning circuit |
| 3 | horizontal scanning circuit |
| 4-1, 4-2 | columns |
| 6-1, 6-2 | output signal lines |
| PD | photodiode |
| Tr1 | first MOS transistor |
| Tr2 | second MOS transistor |
| Tr3 | third MOS transistor |
| Tr4 | fourth MOS transistor |
| Tr5 | fifth MOS transistor |
| C | capacitor |
| Cs | pn junction capacitance |
| Φd | clock |
| Lsig | output signal line |
| Lres | reset line |
| Lvsel | column select line |
| Lint | integration-time control line |
| Vg | gate voltage |
| Vo | voltage |
| Vdd | DC voltage |
| Vres | DC voltage |
| Vss | DC voltage |

DETAILED DESCRIPTION OF THE PREFERRED EMBODIMENTS

Referring now to the drawings, the individual embodiments of a solid-state image pickup device according to the present invention will be described. FIG. 1 schematically shows part of a two-dimensional MOS solid-state image pickup device according to the embodiments of the present invention. In the drawing, reference numerals G11, G12, . . . and Gmn denote pixels arranged in m by n rows and columns (matrix arrangement), 2 denotes a vertical scanning circuit for sequentially scanning columns (lines) 4-1, 4-2, . . . and 4-n, 3 denotes a horizontal scanning circuit for horizontally sequentially reading photoelectric conversion signals led out from the individual pixels onto output signal lines 6-1, 6-2, . . . and 6-m on a pixel-by-pixel basis, and 5 denotes a power-source line. Although the individual pixels are connected not only to the foregoing lines 4-1, 4-2, . . . and 4-n and output signal lines 6-1, 6-2, . . . and 6-m but also to other lines (e.g., a clock line, a bias supply line, and the like), the depiction of the other lines is omitted in FIG. 1 for clarity but shown in FIG. 2 and the subsequent drawings illustrating the individual embodiments.

Figure 2:
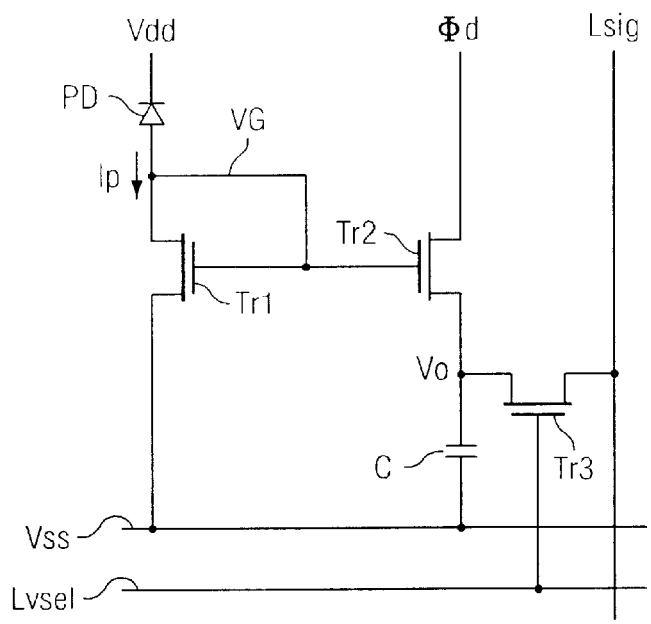
FIG. 2 is a circuit diagram showing the structure of each pixel according to a first embodiment of the present invention.

FIG. 2 shows the structure of each pixel according to a first embodiment of the present invention. In the drawing, PD denotes a photodiode, Tr1, Tr2, and Tr3 denote n-channel MOS transistors, C denotes a capacitor, Vdd and Vss denote DC voltages, Φd denotes a clock, Lsig denotes an output signal line, and Lvsel denotes a column select line.

In FIG. 2, the photodiode PD has a cathode connected to the DC voltage Vdd and an anode connected to both the drain and gate of the first n-channel MOS transistor Tr1, which is in turn connected to the gate of the second n-channel MOS transistor Tr2. The DC voltage Vss is applied to the source of the first MOS transistor, while the clock Φd is applied to the drain of the second MOS transistor. The second MOS transistor Tr2 has a source connected to the DC voltage Vss via the capacitor of the capacitance C. The third n-channel MOS transistor Tr3 has a drain connected to the source of the second MOS transistor Tr2, a source connected to the output signal line Lsig, and a gate connected to the column select line Lvsel.

When light is incident upon the photodiode PD of FIG. 2, an electric current (photocurrent) Ip proportional to the quantity of incident light is generated and logarithmically converted in the first MOS transistor Tr1. As a result, the gate voltage VG of the first MOS transistor becomes proportional to Ln(Ip) which charges the capacitor C through the second MOS transistor Tr2. According, a voltage Vo proportional to the following numerical expression is produced in the capacitor C:

$$Ln \int (Ip) dt$$

where t represents time. When the integration is completed, a high voltage is applied to the column select line Lvsel to turn the third MOS transistor Tr3 ON. Consequently, the integrated charge is read out through the third MOS transistor Tr3 and the output signal line Lsig in accordance with the reading operation of the horizontal scanning circuit 3 of FIG. 1.

After a signal is read out, the clock Φd shifts from a Hi-level to a Low-level so that charges are released from the capacitor C to the clock Φd side through the second MOS transistor Tr2, whereby the voltage Vo in the capacitor is reset to an initial value (corresponding to the Low-level voltage of the clock Φd). Subsequently, the clock Φd shifts from the Low-level to the Hi-level to initiate the subsequent integration. In the present embodiment, the second MOS transistor Tr2 also functions as a reset transistor, resulting in a simple structure.

Since the output obtained is proportional to the logarithm of the integral of the quantity of incident light, a dynamic range which is more than 1000 times as wide as the dynamic range achieved conventionally can be achieved. Moreover, since a variable component resulting from a variation in light from a light source for irradiating the photodiode PD is absorbed in the capacitor C, the signal obtained is highly resistant to the variation in light from the light source. Likewise, since high-frequency noise is also absorbed in the capacitor C, the signal obtained is high in quality and low in noise.

Figure 3:
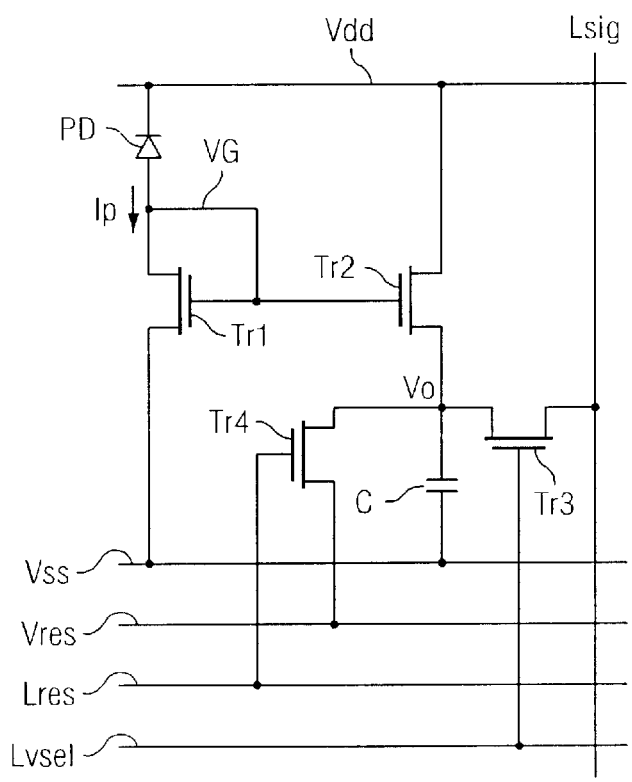
FIG. 3 is a circuit diagram showing the structure of each pixel according to a second embodiment of the present invention.

FIG. 3 shows the structure of each pixel in a solid-state image pickup device according to a second embodiment of the present invention. In the drawing, PD denotes a photodiode, Tr1, Tr2, Tr3, and Tr4 denote n-channel MOS transistors, C denotes a capacitor, Vdd, Vss, and Vres denote DC voltages, Lsig denotes an output signal line, Lvsel denotes a column select line, and Lres denotes a reset line.

In FIG. 3, the photodiode PD has a cathode connected to the DC voltage Vdd and an anode connected to the drain and gate of the first n-channel MOS transistor Tr1 and to the gate of the second n-channel MOS transistor Tr2. The DC voltage Vss is applied to the source of the first MOS transistor Tr1, while the DC voltage Vdd is applied to the drain of the second MOS transistor Tr2.

The second MOS transistor Tr2 has a source connected to the DC voltage Vss via the capacitor C. The third n-channel MOS transistor Tr3 has a drain connected to the source of the second MOS transistor Tr2, a source connected to the output signal line Lsig, and a gate connected to the column select line Lvsel. The fourth n-channel MOS transistor Tr4 has a drain connected to the source of the second MOS transistor Tr2, a source connected to the DC voltage Vres, and a gate connected to the reset line Lres.

When light is incident upon the photodiode PD of FIG. 3, an electric current Ip proportional to the quantity of incident light is generated and logarithmically converted in the first MOS transistor Tr1. As a result, the gate voltage VG becomes proportional to Ln(Ip), which charges the capacitor C through the second MOS transistor Tr2 so that a voltage Vo proportional to Ln $\int$(Ip)dt is produced. When the integration is completed, a high voltage is applied to the column select line Lvsel to turn the third MOS transistor Tr3 ON. Consequently, the integrated charges are read out through the third MOS transistor Tr3 and the output signal line Lsig in accordance with the read operation of the horizontal scanning circuit 3 of FIG. 1.

After a signal is read out, the voltage on the reset line Lres shifts from a Low-level to a Hi-level to turn the fourth MOS transistor Tr4 ON, whereby the voltage Vo is reset to the initial value Vres. Subsequently, the voltage on the reset line Lres shifts from a Hi-level to a Low-level to turn the fourth MOS transistor Tr4 OFF, which initiates the subsequent integration. In the present embodiment, since the output obtained is proportional to the logarithm of the integral of the quantity of incident light, a dynamic range which is more than 1000 times as wide as the dynamic range achieved conventionally can be achieved, similarly to the first embodiment. Moreover, since a variable component resulting from a variation in light from a light source for irradiating the photodiode PD is absorbed in the capacitor C, the signal obtained is highly resistant to the variation in light from the light source. Likewise, since high-frequency noise is also absorbed in the capacitor C, the signal obtained is high in quality and low in noise.

Figure 4:
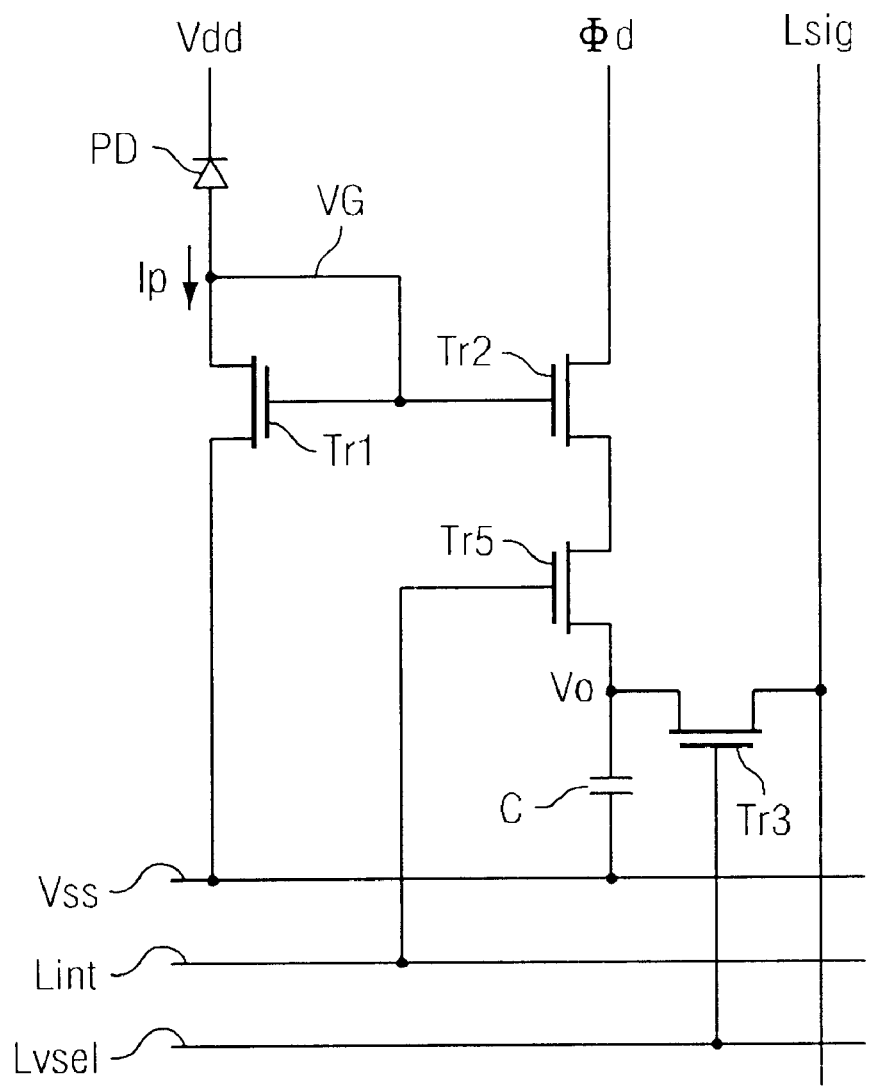
FIG. 4 is a circuit diagram showing the structure of each pixel according to a third embodiment of the present invention.

FIG. 4 shows the structure of each pixel in a solid-state image pickup device according to a third embodiment of the present invention. The third embodiment is characterized in that an additional fifth n-channel MOS transistor Tr5 for controlling an integration time is provided between the source of the second n-channel MOS transistor Tr2 and the capacitor in the first embodiment (FIG. 2). In the drawing, PD denotes a photodiode, Tr1, Tr2, Tr3, and Tr5 denote n-channel MOS transistors, C denotes a capacitor, Vdd and Vss denote DC voltages, $\Phi$d denotes a clock, Lsig denotes an output signal line, Lvsel denotes a column select line, and Lint denotes an integration-time control line.

In FIG. 4, the photodiode PD has a cathode connected to the DC voltage Vdd and an anode connected to the drain and gate of the first n-channel MOS transistor Tr1 and to the gate of the second n-channel MOS transistor Tr2. The DC voltage Vss is applied to the source of the first n-channel MOS transistor Tr1, while the clock $\Phi$d is applied to the drain of the second n-channel MOS transistor Tr2. The fifth n-channel MOS transistor Tr5 has a drain connected to the source of the second n-channel MOS transistor Tr2, a source connected to the DC voltage Vss via the capacitor of the capacitance C, and a gate connected to the integration-time control line Lint. The third n-channel MOS transistor Tr3 has a drain connected to the source of the fifth n-channel MOS transistor Tr5, a source connected to the output signal line Lsig, and a gate connected to the column-select line Lvsel.

When light is incident upon the photodiode PD of FIG. 4, an electric current Ip proportional to the quantity of incident light is generated and logarithmically converted in the first MOS transistor Tr1. As a result, the gate voltage VG becomes proportional to Ln(Ip). When the voltage on the integration-time control line Lint transitions from a Low-level to a Hi-level, the fifth n-channel MOS transistor Tr5 is turned ON and the capacitor C is charged through the fifth n-channel MOS transistor Tr5 and the second n-channel MOS transistor Tr2, so that a voltage Vo, which is proportional to Ln $\int$(Ip)dt, is produced in the capacitor.

When the voltage of the integration-time control line Lint transitions from a Hi-level to a Low-level, the fifth n-channel MOS transistor Tr5 is turned OFF, which completes integration. Then, a high voltage is applied to the column select line Lvsel to turn the third n-channel MOS transistor Tr3 ON, whereby the integrated charge is read out through the third n-channel MOS transistor Tr3 and the output signal line Lsig. After a signal is read out, the integration-time control line Lint is caused to shift to the Hi-level, while, simultaneously, the clock $\Phi$d is caused to shift from a Hi-level to a Low-level, whereby the voltage on the capacitor C is reset to an initial value. Thereafter, the clock $\Phi$d shifts from a Low-level to a Hi-level, which initiates the subsequent integration. In the present embodiment, since the output obtained is proportional to the logarithm of the integral of the quantity of incident light, there can be obtained a low-noise signal having a dynamic range more than 1000 times as wide as the dynamic range achieved conventionally and a signal that is highly resistant to the variation in light from the light source. Moreover, since the integration time is completely equal for each pixel, the present embodiment has the advantage of providing high-quality still images even of moving objects with a simple structure.

Figure 5:
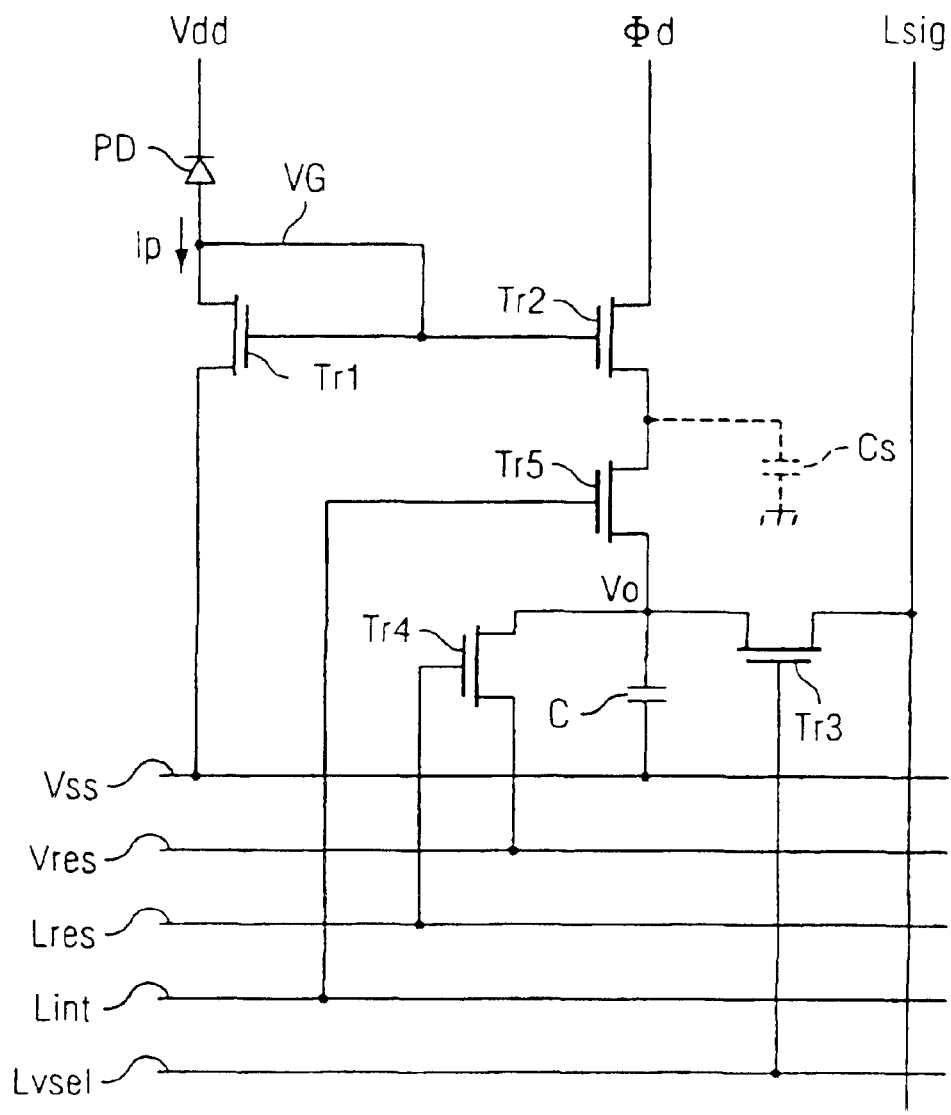
FIG. 5 is a circuit diagram showing the structure of each pixel according to a fourth embodiment of the present invention.
Figure 12:
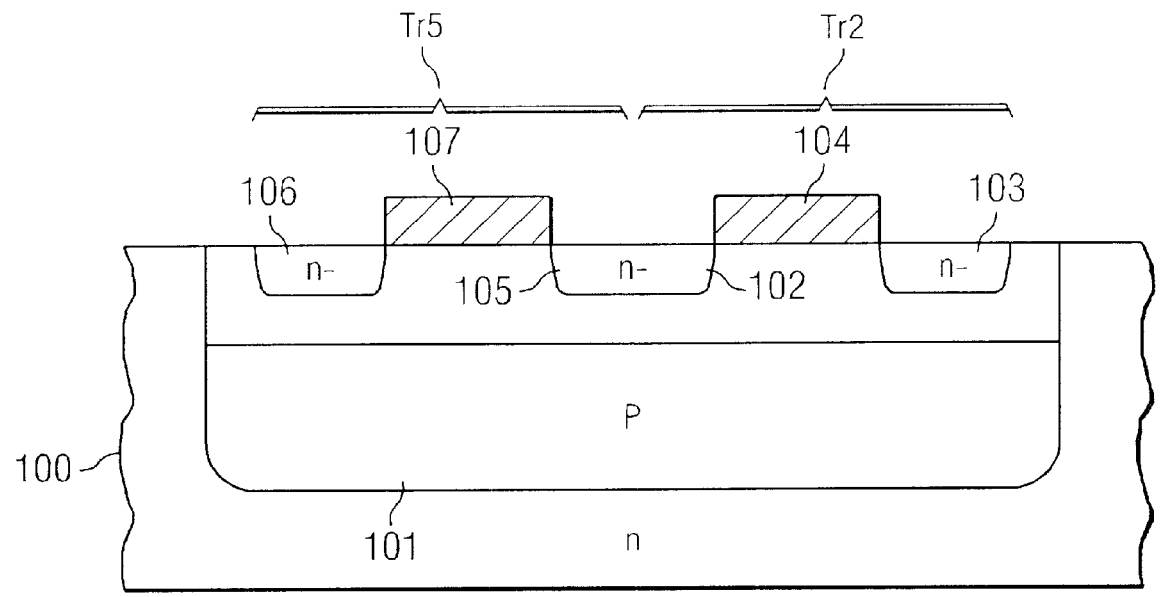
FIG. 12 is a structural view showing the structure of a pn junction capacitance Cs according to the fourth embodiment.
Figure 13:
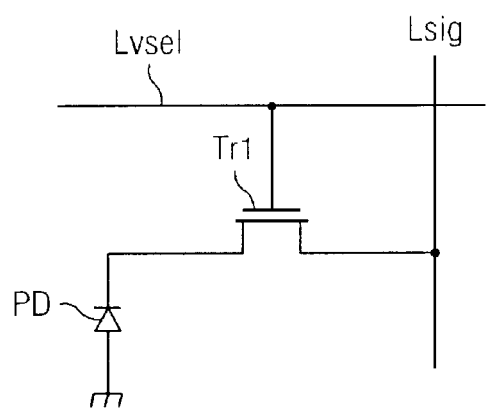
FIG. 13 is a circuit diagram showing the structure of each pixel in a conventional solid-state image pickup device.

FIG. 5 shows the structure of each pixel in a solid-state image pickup device according to a fourth embodiment of the present invention. In the drawing, PD denotes a photodiode, Tr1, Tr2, Tr3, Tr4, and Tr5 denote n-channel MOS transistors, C denotes a capacitor, Cs denotes a pn junction capacitance related to the source of the second MOS transistor Tr2 (the drain of the fifth MOS transistor Tr5), Vdd, Vss, and Vres denote DC voltages, $\Phi$d denotes a clock, Lsig denotes an output signal line, Lvsel denotes a column select line, Lres denotes a reset line, and Lint denotes an integration-time control line. As shown in FIG. 12, the aforesaid pn junction capacitance Cs is formed between the P-well layer 101 and the source region 102 of the second MOS transistor Tr2 each of which are formed in an n-type semiconductor substrate 100. It is to be noted that the source region 102 also serves as the drain region 105 of the fifth MOS transistor. In the drawing, a reference numeral 103 denotes the drain region of the second MOS transistor Tr2 and a reference numeral 106 denotes the source region of the fifth MOS transistor Tr5. Reference numerals 104 and 107 denote the respective gate electrodes of the second and fifth MOS transistors Tr2 and Tr5.

In FIG. 5, the photodiode PD has a cathode connected to the DC voltage Vdd and an anode connected to the drain and gate of the first MOS transistor Tr1 and to the gate of the second MOS transistor Tr2. The DC voltage Vss is applied to the source of the first MOS transistor Tr1, while the clock Φd is applied to the drain of the second MOS transistor Tr2. The fifth MOS transistor Tr5 has a drain connected to the source of the second MOS transistor Tr2, a source connected to the DC voltage Vss via the capacitor C, and a gate connected to the integration-time control line Lint.

The third MOS transistor Tr3 has a drain connected to the source of the fifth MOS transistor, a source connected to the output signal line Lsig, and a gate connected to the column select line Lvsel. The fourth n-channel MOS transistor Tr4, has a drain connected to the source of the fifth MOS transistor Tr5, a source connected to the DC voltage Vres, and a gate connected to the reset line Lres.

When light is incident upon the photodiode PD of FIG. 5, an electric current Ip proportional to the quantity of incident light is generated and logarithmically converted in the first MOS transistor Tr1. As a result, the gate voltage VG becomes proportional to Ln(Ip). When the voltage on the integration-time control line Lint transitions from a Low-level to a Hi-level, the fifth MOS transistor Tr5 is turned ON and the capacitor C is charged through the fifth MOS transistor Tr5 and the second MOS transistor Tr2, so that a voltage Vo proportional to Ln $\int$(Ip)dt is produced. When the voltage of the integration-time control line Lint transitions from the Hi-level to the Low level, the fifth MOS transistor Tr5 is turned OFF, which completes integration in the capacitor C.

After fifth MOS transistor Tr5 is turned OFF, a high voltage is applied to the column select line Lvsel to turn the third MOS transistor Tr3 ON, whereby the charge integrated on the capacitor C is read out through the third MOS transistor Tr3 and the output signal line Lsig. During the reading of a signal, the clock Φd is caused to shift from a Hi-level to a Low-level, whereby the voltage on the source of the second MOS transistor Tr2 and on the drain of the fifth MOS transistor Tr5 is reset to an initial value. Thereafter, the clock Φd is caused to shift to the Hi-level, which initiates the subsequent integration in the pn junction capacitance Cs. Consequently, the subsequent integrating operation is initiated by the pn junction capacitance Cs during the reading of the signal from capacitor C. After the signal is read out from capacitor C, the voltage on the reset line Lres is caused to shift from the Low-level to the Hi-level to turn the fourth MOS transistor Tr4 ON and thereby reset the voltage on the capacitor C to Vres. Even while the voltage on the capacitor C is being reset, integration of signal is performed in the pn junction capacitance Cs.

Thereafter, the voltage on the integration-time control line Lint is transitioned to a Hi-level to turn the fifth MOS transistor Tr5 ON so that the charge accumulated in the pn junction capacitance Cs are transferred to the capacitor C.

Even while the charge accumulated in the pn junction capacitance Cs is being transferred to the capacitor C, integration of the signal based on the photoelectric current generated in the photodiode PD is performed continuously in the capacitor C.

In the present embodiment, since the output obtained is proportional to the logarithm of the integral of the quantity of incident light, there can be obtained a low-noise signal having a dynamic range more than 1000 times as wide as the dynamic range achieved conventionally and highly resistant to the variation in light from the light source. Moreover, since the integration time is completely equal for each pixel, the present embodiment has the advantage of providing high-quality still images and dynamic images even of moving objects.

Figure 6:
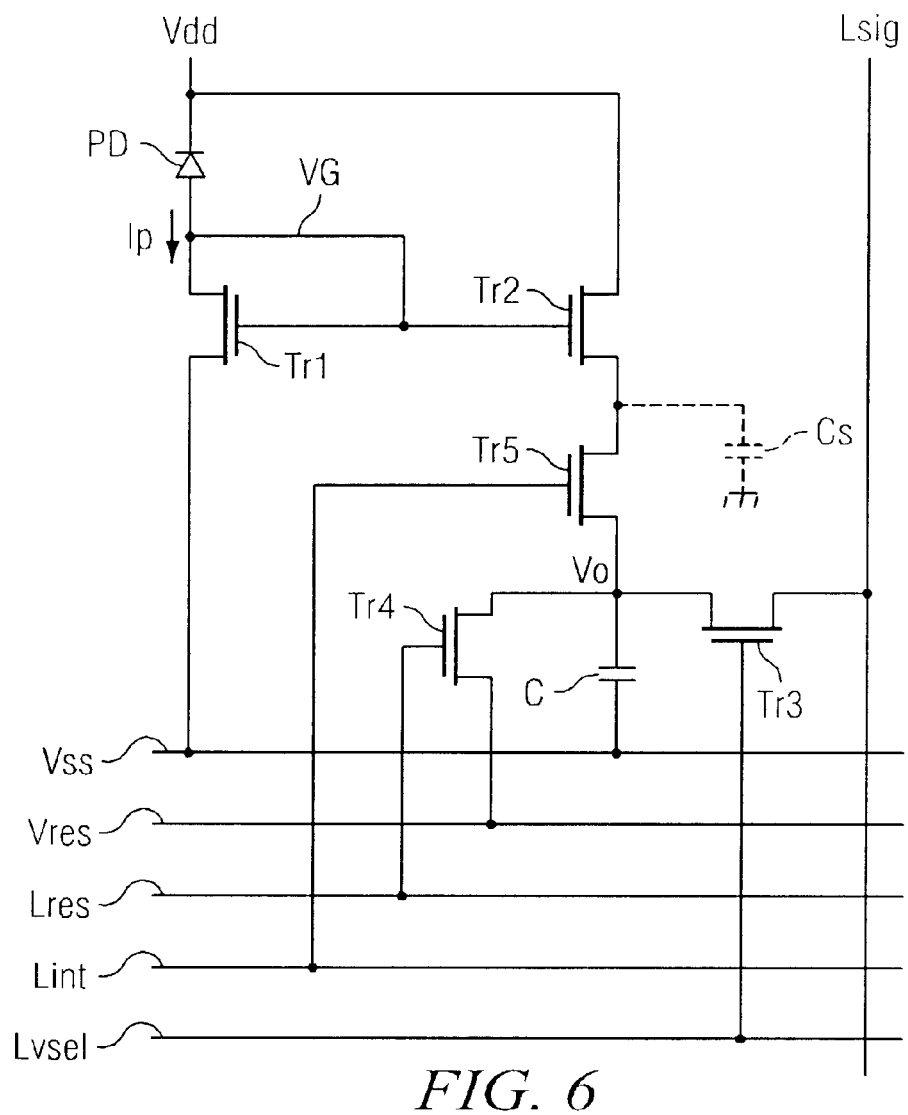
FIG. 6 is a circuit diagram showing the structure of each pixel according to a fifth embodiment of the present invention.

A fifth embodiment shown in FIG. 6, which will be described below, is different from the fourth embodiment (FIG. 5) described above only in that the second MOS transistor Tr2 has a drain connected to a direct-current power source Vdd. As for the other components, they have the same structure as in the fourth embodiment. In the fifth embodiment, it may be considered that the turning ON of the fifth MOS transistor Tr5 for transferring charges to the capacitor C corresponds to the resetting of the voltage on the pn junction capacitance Cs and that integration in the pn junction capacitance Cs is initiated upon the turning OFF of the fifth MOS transistor Tr5 for read operation. Since the output obtained is proportional to the logarithm of the integral of the quantity of incident light in the present embodiment, there can be obtained a low-noise signal having a dynamic range more than 1000 times as wide as the dynamic range achieved conventionally and highly resistant to the variation in light from the light source. Moreover, since the integration time is completely equal for each pixel, the present embodiment has the advantage of providing high-quality still images even of moving objects.

Figure 7:
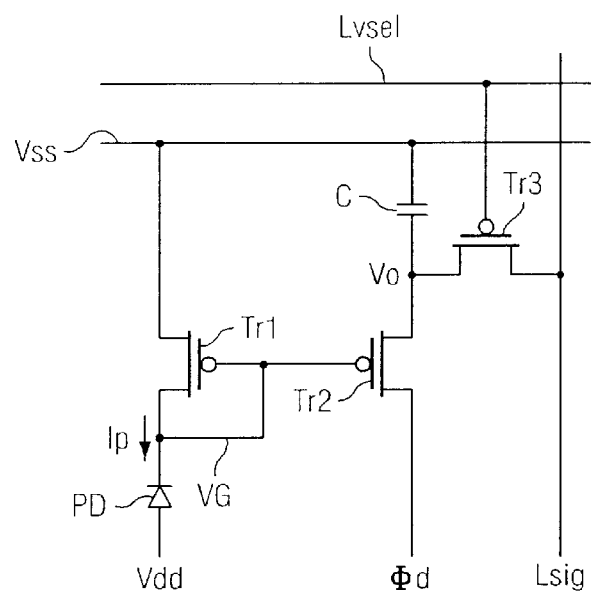
FIG. 7 is a circuit diagram showing the structure of each pixel according to a sixth embodiment of the present invention.

FIG. 7 shows the structure of each pixel in a solid-state image pickup device according to a sixth embodiment of the present invention. In the drawing, PD denotes a photodiode, Tr1, Tr2, and Tr3 denote p-channel MOS transistors, C denotes a capacitor, Vdd and Vss denote DC voltages, Φd denotes a clock, Lsig denotes an output signal line, Lvsel denotes a column select line, and Lres denotes a reset line.

In FIG. 7, the photodiode PD has an anode connected to the DC voltage Vdd and a cathode connected to the drain and gate of the first p-channel MOS transistor Tr1 and to the gate of the second p-channel MOS transistor Tr2. The DC voltage Vss is applied to the source of the first p-channel MOS transistor Tr1, while the clock Φd is applied to the drain of the second p-channel MOS transistor Tr2. The second p-channel MOS transistor Tr2 has a source connected to the DC voltage Vss via the capacitor C. The third p-channel MOS transistor Tr3 has a source connected to the source of the second p-channel MOS transistor Tr2, a drain connected to the output signal line Lsig, and a gate connected to the column select line Lvsel.

When light is incident upon the photodiode PD of FIG. 7, an electric current Ip proportional to the quantity of incident light is generated and logarithmically converted in the first p-channel MOS transistor Tr1. As a result, the gate voltage VG becomes proportional to Ln(Ip), which discharges the capacitor C through the second p-channel MOS transistor Tr2 so that a voltage Vo proportional to Ln $\int$(Ip)dt is produced in the capacitor C. When the integration is completed, a Low-voltage is applied to the column select line Lvsel to turn the third p-channel MOS transistor Tr3 ON.

Consequently, the integrated charge is read out through the third p-channel MOS transistor Tr3 and the output signal line Lsig. After the signal is read out, the clock Φd shifts from a Low-level to a Hi-level so that the voltage Vo is reset to the initial value. Subsequently, the clock Φd shifts from the Hi-level to a Low-level to initiate the subsequent integration. In the present embodiment, the second p-channel MOS transistor Tr2 also serves as a reset transistor, resulting in a simple structure. Since the output obtained is proportional to the logarithm of the integral of the quantity of incident light, a dynamic range which is more than 1000 times as wide as the dynamic range achieved conventionally can be achieved. Moreover, since a variable component resulting from a variation in light from a light source for irradiating the photodiode PD is absorbed in the capacitor C, the signal obtained is highly resistant to the variation in light from the light source. Likewise, since high-frequency noise is absorbed in the capacitor C, the signal obtained is high in quality and low in noise.

Figure 8:
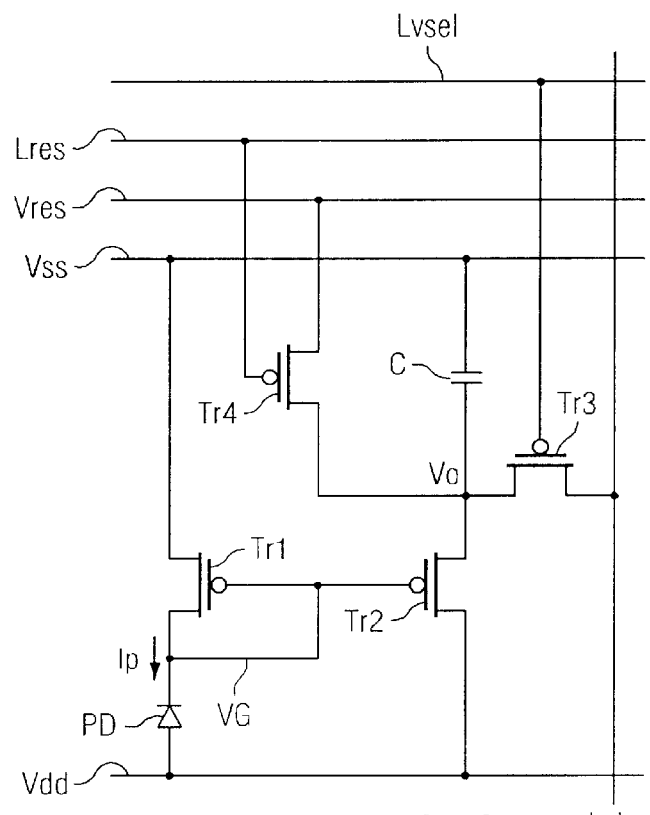
FIG. 8 is a circuit diagram showing the structure of each pixel according to a seventh embodiment of the present invention.

FIG. 8 shows the structure of each pixel in a solid-state image pickup device according to a seventh embodiment of the present invention. In the drawing, PD denotes a photodiode, Tr1, Tr2, Tr3, and Tr4 denote p-channel MOS transistors, C denotes a capacitor, Vdd, Vss, and Vres denote DC voltages, Lsig denotes an output signal line, Lvsel denotes a column select line, and Lres denotes a reset line.

In FIG. 8, the photodiode PD has an anode connected to the DC voltage Vdd and a cathode connected to the drain and gate of the first p-channel MOS transistor Tr1 and to the gate of the second p-channel MOS transistor Tr2. The DC voltage Vss is applied to the source of the first MOS transistor Tr1, while the DC voltage Vdd is applied to the drain of the second MOS transistor Tr2.

The second p-channel MOS transistor Tr2 has a source connected to the DC voltage Vss via the, capacitor C. The third p-channel MOS transistor Tr3 has a source connected to the source of the second p-channel MOS transistor Tr2, a drain connected to the output signal line Lsig, and a gate connected to the column select line Lvsel. The fourth p-channel MOS transistor Tr4 has a drain connected to the source of the second p-channel MOS transistor Tr2, a source connected to the DC voltage Vres, and a gate connected to the reset line Lres.

When light is incident upon the photodiode PD of FIG. 8, an electric current Ip proportional to the quantity of incident light is generated and logarithmically converted in the first MOS transistor Tr1. As a result, the gate voltage VG becomes proportional to Ln(Ip), which discharges the capacitor C through the second MOS transistor Tr2 so that a voltage Vo proportional to Ln $\int$(Ip)dt is produced in the capacitor C. When the integration is completed, a low voltage is applied to the column select line Lvsel to turn the third MOS transistor Tr3 ON. Consequently, the integrated charges are read out through the third MOS transistor Tr3 and the output signal line Lsig.

After the signal is read out, the voltage on the reset line Lres shifts from the Hi-level to the Low-level, whereby the voltage Vo is reset to the initial value Vres. Subsequently, the voltage on the reset line Lres shifts from the Low-level to the Hi-level, which initiates the subsequent integration. In the present embodiment, since the output obtained is proportional to the logarithm of the integral of the quantity of incident light, a dynamic range which is more than 1000 times as wide as the dynamic range achieved conventionally can be achieved, similarly to the first embodiment. Moreover, since a variable component resulting from a variation in light from a light source for irradiating the photodiode PD is absorbed in the capacitor C, the signal obtained is highly resistant to the variation in light from the light source. Likewise, since high-frequency noise is absorbed in the capacitor C, the signal obtained is high in quality and low in noise.

Figure 9:
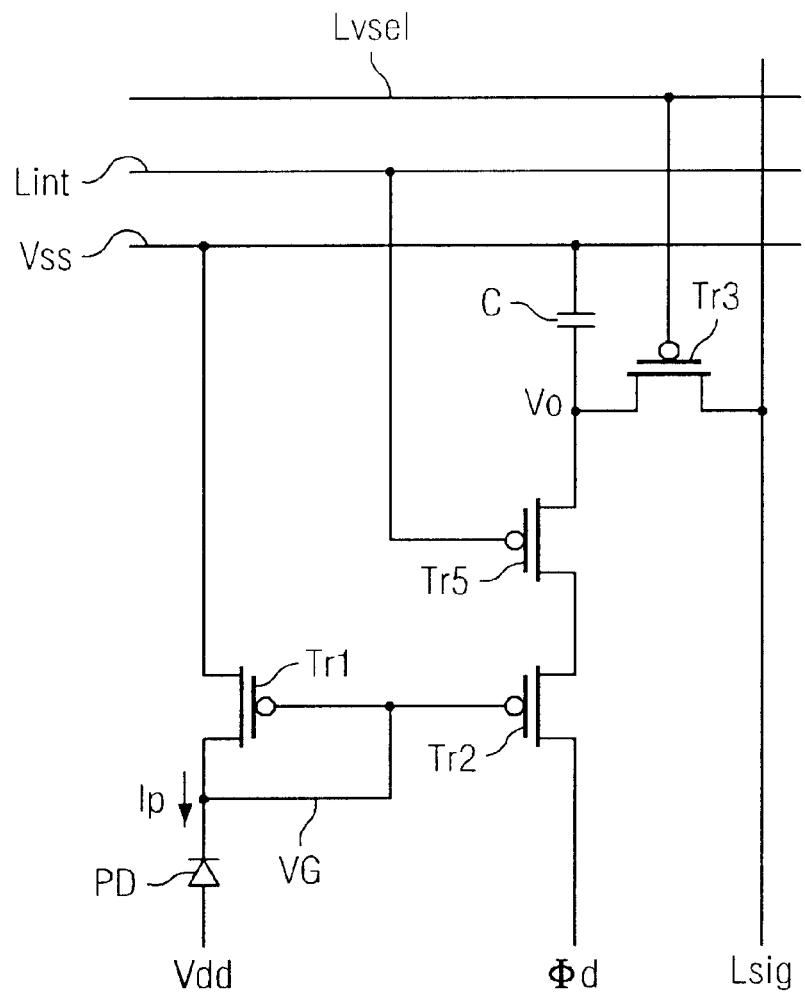
FIG. 9 is a circuit diagram showing the structure of each pixel according to an eighth embodiment of the present invention.

FIG. 9 shows the structure of each pixel in the solid-state image pickup device according to an eighth embodiment of the present invention. In the present embodiment, an additional fifth p-channel MOS transistor Tr5 for controlling an integration time is provided between the source of the second p-channel MOS transistor Tr2 and the capacitor C in the sixth embodiment (FIG. 7). In the drawing, PD denotes a photodiode, Tr1, Tr2, Tr3, and Tr5 denote p-channel MOS transistors, C denotes a capacitor, Vdd and Vss denote DC voltages, Φd denotes a clock, Lsig denotes an output signal line, Lvsel denotes a column select line, and Lint denotes an integration-time control line.

In FIG. 9, the photodiode PD has an anode connected to the DC voltage Vdd and a cathode connected to the drain and gate of the first p-channel MOS transistor Tr1 and to the gate of the second p-channel MOS transistor Tr2. The DC voltage Vss is applied to the source of the first MOS transistor Tr1, while the clock Φd is applied to the drain of the second MOS transistor Tr2. The fifth p-channel MOS transistor Tr5 has a drain connected to the source of the second p-channel MOS transistor, a source connected to the DC voltage Vss via the capacitor C, and a gate connected to the integration-time control line Lint. The third p-channel MOS transistor Tr3 has a source connected to the source of the fifth p-channel MOS transistor Tr5, a drain connected to the output signal line Lsig, and a gate connected to the column select line Lvsel.

When light is incident upon the photodiode PD of FIG. 9, an electric current Ip proportional to the quantity of incident light is generated and logarithmically converted in the first p-channel MOS transistor Tr1. As a result, the gate voltage VG becomes proportional to Ln(Ip). When the voltage on the integration-time control line Lint is transitioned from a Hi-level to a Low-level, the fifth p-channel MOS transistor Tr5 is turned ON and the capacitor C is charged through the fifth p-channel transistor Tr5 and the second p-channel MOS transistor Tr2, so that the voltage Vo proportional to Ln $\int$(Ip)dt is produced in the capacitors C.

When the voltage on the integration-time control line Lint is transitioned from the Low-level to a Hi-level, the fifth p-channel transistor Tr5 is turned OFF, which completes the integration. Then, a low voltage is applied to the column select line Lvsel to turn the third p-channel MOS transistor Tr5 ON, whereby the integrated charge is read out through the third p-channel MOS transistor Tr3 and the output signal line Lsig. After a signal is read out, the integration-time control line Lint is caused to shift to a Low-level, while, simultaneously, the clock Φd is caused to shift from a Low-level to a Hi-level, whereby the voltage on the capacitor C is reset to the initial value.

Thereafter, the clock Φd shifts from the Hi-level to a Low-level, which initiates the subsequent integration. In the present embodiment, since the output obtained is proportional to the logarithm of the integral of the quantity of incident light, a dynamic range which is more than 1000 times as wide as the dynamic range achieved conventionally can be achieved, similarly to the first embodiment. Moreover, since a variable component resulting from a variation in light from a light source for irradiating the photodiode PD is absorbed in the capacitor C, the signal obtained is highly resistant to the variation in light from the light source. Likewise, since high-frequency noise is absorbed in the capacitor C, the signal obtained is high inequality and low in noise. Moreover, since the integration time is completely equal for each pixel, the present embodiment has the advantage of providing high-quality still images even of moving objects.

Figure 10:
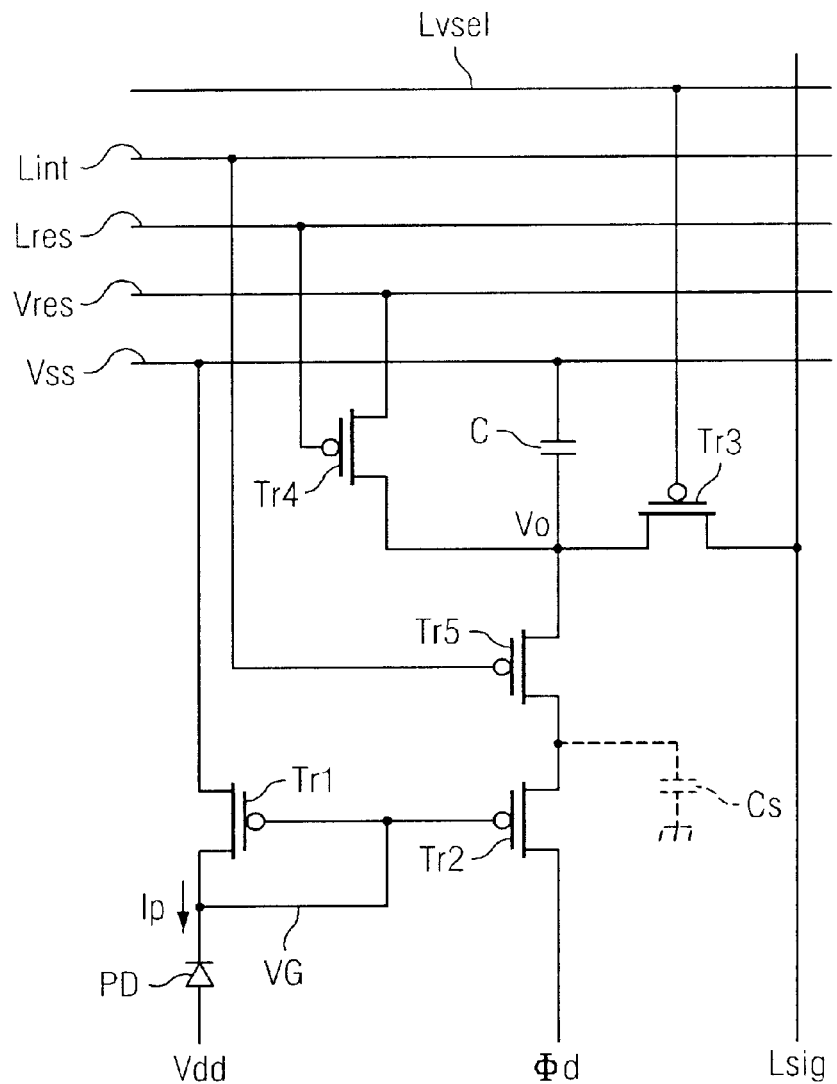
FIG. 10 is a circuit diagram showing the structure of each pixel according to a ninth embodiment of the present invention.

FIG. 10 shows the structure of each pixel in a solid-state image pickup device according to a ninth embodiment of the present invention. In the drawing, PD denotes a photodiode, Tr1, Tr2, Tr3, Tr4, and Tr5 denote p-channel MOS transistors, C denotes a capacitor, Cs denotes a pn junction capacitance related to the source of the second MOS transistor Tr2 (the drain of the fifth MOS transistor Tr5), Vdd, Vss, and Vres denote DC voltages, Φd denotes a clock, Lsig denotes an output signal line, Lvsel denotes a column select line, Lres denotes a reset line, and Lint denotes an integration-time control line.

In FIG. 10, the photodiode PD has an anode connected to the DC voltage Vdd and a cathode connected to the drain and gate of the first p-channel MOS transistor Tr1 and to the gate of the second p-channel MOS transistor Tr2. The DC voltage Vss is applied to the source of the first MOS transistor Tr1, while the clock Φd is applied to the drain of the second MOS transistor Tr2. The fifth p-channel MOS transistor Tr5 has a drain connected to the source of the second MOS transistor Tr2, a source connected to the DC voltage Vss via the capacitor C, and a gate connected to the integration-time control line Lint.

The third p-channel MOS transistor Tr3 has a source connected to the source of the fifth MOS transistor, a drain connected to the output signal line Lsig, and a gate connected to the column select line Lvsel. The fourth p-channel MOS transistor Tr4 has a drain connected to the source of the fifth MOS transistor Tr5, a source connected to the DC voltage Vres, and a gate connected to the reset line Lres.

When light is incident upon the photodiode PD of FIG. 10, an electric current Ip proportional to the quantity of incident light is generated and logarithmically converted in the first MOS transistor Tr. As a result, a gate voltage VG becomes proportional to Ln(Ip). When the voltage of the integration-time control line Lint is transitioned from a Hi-level to a Low-level, the fifth MOS transistor Tr5 is turned ON and the capacitor C is charged through the transistor Tr5 and the second MOS transistor Tr2, so that the voltage Vo proportional to $\text{Ln} \int (\text{Ip})dt$ is produced. When the voltage of the integration-time control line Lint is transitioned from the Low level to the Hi-level, the fifth MOS transistor Tr5 is turned OFF, which completes the integration in the capacitor C.

Then, a low voltage is applied to the column select line Lvsel to turn the third MOS transistor Tr3 ON, whereby the charges integrated in the capacitor C are read out through the third MOS transistor Tr3 and the output signal line Lsig. During the reading of a signal, the clock Φd is transitioned from a Low-level to a Hi-level, whereby the voltage on the source of the transistor Tr2 and on the drain of the fifth MOS transistor Tr5 is reset to the initial value. Thereafter, the clock Φd is transitioned to a Low level, which initiates the subsequent integration in the pn junction capacitance Cs. Consequently, the subsequent integrating operation is initiated by the pn junction capacitance Cs during the reading of the signal. After the signal is read out, the voltage on the reset line Lres is transitioned from a Hi-level to a Low-level to turn the fourth MOS transistor Tr4 ON and thereby reset the voltage on the capacitor C to Vres. Even while the voltage on the capacitor C is being reset, integration of signal is performed in the pn junction capacitance Cs.

Thereafter, the voltage on the integration-time control line Lint is transitioned to a Low level to turn the transistor Tr5 ON so that the charge accumulated in the pn junction capacitance Cs are transferred to the capacitor C. The transfer of charge accumulated in the pn junction capacitance Cs occurs even while the integration of the signal based on the photoelectric current generated in the photodiode PD is performed in the capacitor C. In the present embodiment, since the output obtained is proportional to the logarithm of the integral of the quantity of incident light, there can be obtained a low-noise signal having a dynamic range more than 1000 times as wide as the dynamic range achieved conventionally and highly resistant to the variation in light from the light source. Moreover, since the integration time is completely equal for each pixel, the present embodiment has the advantage of providing high-quality still images and dynamic images even of moving objects.

Figure 11:
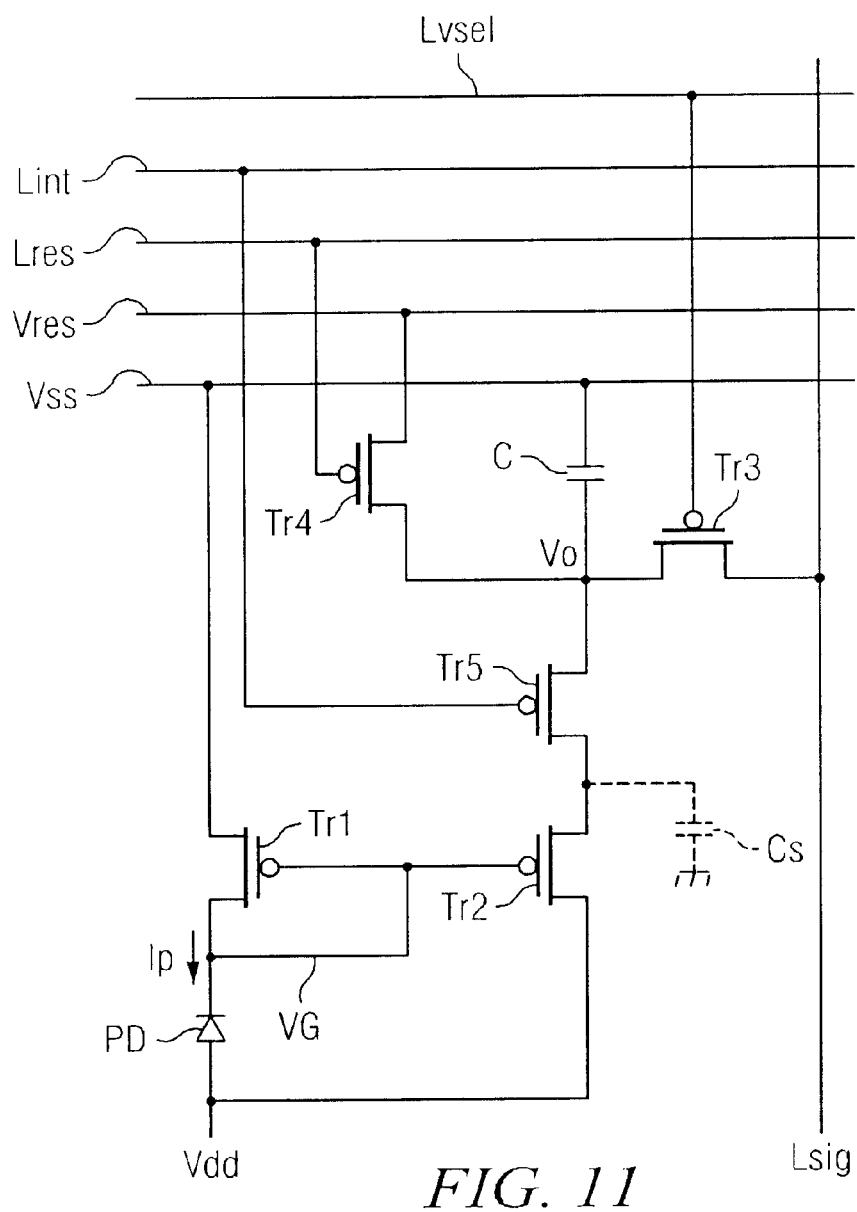
FIG. 11 is a circuit diagram showing the structure of each pixel according to a tenth embodiment of the present invention.

A tenth embodiment shown in FIG. 11, which will be described below, is different from the ninth embodiment (FIG. 10) described above only in that the second MOS transistor Tr2 has a drain connected to a direct-current power source Vdd. As for the other components, they have the same structure as in the ninth embodiment. In the tenth embodiment, it may be considered that the turning ON of the fifth MOS transistor Tr5 for transferring charges to the capacitor C corresponds to the resetting of the voltage on the pn junction capacitance Cs and that integration in the pn junction capacitance Cs is initiated upon the turning OFF of the fifth MOS transistor Tr5 for the reading operation. Since the output obtained is proportional to the logarithm of the integral of the quantity of incident light in the present embodiment, there can be obtained a low-noise signal having a dynamic range more than 1000 times as wide as the dynamic range achieved conventionally and highly resistant to the variation in light from the light source. Moreover, since the integration time is completely equal for each pixel, the present embodiment has the advantage of providing high-quality still images even of moving objects with a simple structure.

In the second (FIG. 3), fourth (FIG. 5), fifth (FIG. 6), seventh (FIG. 8), ninth (FIG. 10), and tenth (FIG. 11) embodiments described above, it is also possible to constantly apply a DC voltage, instead of a pulse, as a reset voltage to the gate of the fourth MOS transistor Tr4. In that case, the fourth MOS transistor Tr4 constantly in the ON state becomes equivalent to a resistor. It follows therefore, that the resistor having the specified value is connected to the capacitor so as to determine the initial value of the capacitor C. In other words, the initial value of the capacitor C can be adjusted by varying the direct-current voltage applied to the gate electrode of the fourth MOS transistor Tr4.

As can be seen by the above-described embodiments, the present invention provides a two-dimensional solid-state image pickup device with a wide dynamic range which produces a high-quality output having a reduced noise component and less susceptible to a variation in light from a light source. Moreover, since the integration time is equal for each pixel in several of the embodiments, the present invention has the advantage of providing high-quality still images even of moving objects with a simple structure. Furthermore, since the integrating operation can be performed even during the reading of integrated charges in several of the embodiments, a high quality dynamic picture can also be provided.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A two-dimensional solid-state image pickup device having a plurality of pixels arranged in a matrix, each of said plurality of pixels comprising:
   a photodiode;
   a first MOS transistor having a first electrode and a gate electrode each connected to a first electrode of said photodiode, said first MOS transistor adapted for operating in a subthreshold region;
   a second MOS transistor having a gate electrode connected to said gate electrode of the first MOS transistor and a first electrode connected to a first voltage application line capable of applying a first voltage;
   a capacitor having a first terminal connected to a second electrode of said second MOS transistor and a second terminal connected to a second voltage application line capable of applying a second voltage; and
   a third MOS transistor for selecting a read operation, said third MOS transistor having a first electrode connected to said one terminal of said capacitor, a second electrode connected to an output signal line and a gate electrode connected to a column select line.

2. A two-dimensional solid-state image pickup device in accordance with claim 1, further comprising:
   a fourth MOS transistor having a drain connected to said source of said second MOS transistor and to a first terminal of said capacitor, and a gate connected to a third voltage application line capable of applying a third voltage.

3. A two-dimensional solid-state image pickup device having a plurality of pixels arranged in a matrix, each of said plurality of pixels comprising:
   a photodiode;
   a first MOS transistor having a first electrode and a gate electrode each of which are connected to one electrode of said photodiode, said first MOS transistor adapted for operating in a subthreshold region;
   a second MOS transistor having a gate electrode connected to said gate electrode of said first MOS transistor and a first electrode connected to a first voltage application line capable of applying a first voltage;
   a capacitor having one terminal connected to receive a signal from a second electrode of said second MOS transistor and a second terminal connected to a second voltage application line capable of applying a second voltage, said capacitor for integrating a signal based on an output from said second electrode of said second MOS transistor;
   a third MOS transistor for selecting a read operation, said third MOS transistor having a first electrode connected to said one terminal of said capacitor, a second electrode connected to an output signal line and a gate electrode connected to a column select line; and
   a fourth MOS transistor having a first electrode connected to said one terminal of said capacitor and a second electrode connected to a third voltage application line capable of applying a third voltage, said fourth MOS transistor adapted for being constantly in an ON state with a fourth voltage applied to a gate thereof.

4. A two-dimensional solid-state image pickup device in accordance with claim 3, wherein a value of said fourth voltage applied to said gate of said fourth MOS transistor sets an initial value of said capacitor.

5. A two-dimensional solid-state image pickup device in accordance with claim 1, wherein said first electrode and said gate electrode of said first MOS transistor are directly connected to said first electrode of said photodiode.

6. A two-dimensional solid-state image pickup device in accordance with claim 1, wherein a value of the first voltage is fixed.

7. A two-dimensional solid-state image pickup device in accordance with claim 1, wherein a value of the second voltage is fixed.

8. A two-dimensional solid-state image pickup device in accordance with claim 1, wherein said first electrode of said third MOS transistor is directly connected to said one terminal of said capacitor.

9. A two-dimensional solid-state image pickup device in accordance with claim 2, wherein a value of the third voltage is fixed.

10. A two-dimensional solid-state image pickup device in accordance with claim 3, wherein a value of the first voltage is fixed.

11. A two-dimensional solid-state image pickup device in accordance with claim 3, wherein said first electrode and said gate electrode of said first MOS transistor are directly connected to said one electrode of said photodiode.

12. A two-dimensional solid state image pickup device in accordance with claim 3, wherein a value of the first voltage is fixed.

13. A two-dimensional solid state image pickup device in accordance with claim 3, wherein a value of the second voltage is fixed.

14. A two-dimensional solid-state image pickup device in accordance with claim 3, wherein said first electrode of said third MOS transistor is directly connected to said one terminal of said capacitor.

15. A two-dimensional solid-state image pickup device in accordance with claim 4, wherein a value of the fourth voltage is fixed.

16. A solid-state image pickup device having a semiconductor substrate, a plurality of pixels arranged on said substrate, and a scanning element for sequentially reading respective signals from each of said pixels, each of said pixels comprising:
   a pn-junction photodiode having an anode connected to a first voltage application line capable of applying a first voltage, said photodiode for generating a photocurrent proportional to a quantity of incident light;
   a first MOS transistor being a p-channel MOS transistor and having a drain and a gate each connected to a cathode of said photodiode and a source connected to a second voltage application line capable of a second voltage;
   a second MOS transistor having a gate connected to said gate of said first MOS transistor and a source for connection to said second voltage application line through a capacitor; and
   a third MOS transistor having a source connected to said source of the second MOS transistor and to said capacitor, a gate connected to a column select line and a drain connected to an output signal line;
   wherein said first MOS transistor is adapted to operate in a subthreshold region.

17. A two-dimensional image pickup device in accordance with claim 16, further comprising:
   a fourth MOS transistor having a drain connected to said source of said second MOS transistor and to a first terminal of said capacitor, and a gate connected to a third voltage application line capable of applying a third voltage.

18. A two-dimensional solid-state image pickup device in accordance with claim 16, wherein said drain and said gate of said first MOS transistor are directly connected to said cathode of said photodiode.

19. A two-dimensional solid-state image pickup device in accordance with claim 16, wherein a value of said first voltage is fixed.

20. A two-dimensional solid-state image pickup device in accordance with claim 16, wherein a value of said second voltage is fixed.

21. A two-dimensional solid state image pickup device in accordance with claim 16, wherein said source of said third MOS transistor is directly connected to said second MOS transistor and to said capacitor.

22. A two-dimensional solid-state image pickup device in accordance with claim 16, wherein a value of said third voltage is fixed.

23. A two-dimensional solid-state image pickup device in accordance with claim 17, wherein a value of said third voltage is fixed.

24. A two-dimensional solid-state image pickup device with claim 16, wherein said drain of said second MOS transistor is connected to said first voltage application line.

* * * * *